United States Patent
Kaczmarek

(10) Patent No.: US 8,651,845 B2
(45) Date of Patent: Feb. 18, 2014

(54) APPARATUS FOR INJECTION MOLDING A PLASTIC MOLDED PART ONTO A FUNCTIONAL PART SO AS TO FORM A MULTI-COMPONENT PART

(71) Applicant: Zahoransky AG, Todtnau (DE)

(72) Inventor: Ulrich Kaczmarek, Emmendingen (DE)

(73) Assignee: Zahoransky AG, Todtnau (DE)

( * ) Notice: Subject to any disclaimer, the term of this patent is extended or adjusted under 35 U.S.C. 154(b) by 0 days.

(21) Appl. No.: 13/688,827

(22) Filed: Nov. 29, 2012

(65) Prior Publication Data
US 2013/0142897 A1 Jun. 6, 2013

(30) Foreign Application Priority Data
Dec. 3, 2011 (DE) .......................... 10 2011 120 403

(51) Int. Cl.
B29C 45/14 (2006.01)

(52) U.S. Cl.
USPC .......................... 425/126.1; 425/444; 425/556

(58) Field of Classification Search
USPC ....................... 425/126.1, 444, 556
See application file for complete search history.

(56) References Cited

U.S. PATENT DOCUMENTS

| | | | | |
|---|---|---|---|---|
| 3,330,004 A | * | 7/1967 | Cloyd et al. | ................. 425/112 |
| 3,380,118 A | * | 4/1968 | Gualtier | ..................... 425/126.1 |
| 3,837,772 A | * | 9/1974 | Van de Walker et al. | .. 425/126.1 |
| 4,726,925 A | * | 2/1988 | Binder | ........................... 425/556 |
| 4,834,638 A | * | 5/1989 | Miyahara et al. | ........... 425/126.1 |
| 2010/0270702 A1 | | 10/2010 | Zelkovich et al. | |

FOREIGN PATENT DOCUMENTS

| | | |
|---|---|---|
| EP | 0315586 | 9/1991 |
| EP | 1744969 | 3/2009 |
| EP | 2140896 | 1/2010 |

* cited by examiner

*Primary Examiner* — Robert B Davis
(74) *Attorney, Agent, or Firm* — Volpe and Koenig, P.C.

(57) ABSTRACT

An apparatus (1) for injection molding a plastic molded part onto a functional part so as to form a multi-component part has an injection mold which has a mold opening for receiving the functional part. The injection mold (5) itself has at least three mold plates (6a, 6b, 6c) which can be adjusted between a closed injection position and a processing position with the mold plates spaced apart from one another in each case. A functional part carrier (13), which can be positioned between a functional part store (12) and a first opening region (7a) between two mold plates (6b, 6c) in the processing position thereof, is provided for transferring the functional parts (3) from the functional part store (12) to one of the mold plates (6c), and a withdrawal gripper (19) is provided for withdrawing the multi-component part (4) from a second opening region (7b) between two mold plates.

19 Claims, 2 Drawing Sheets

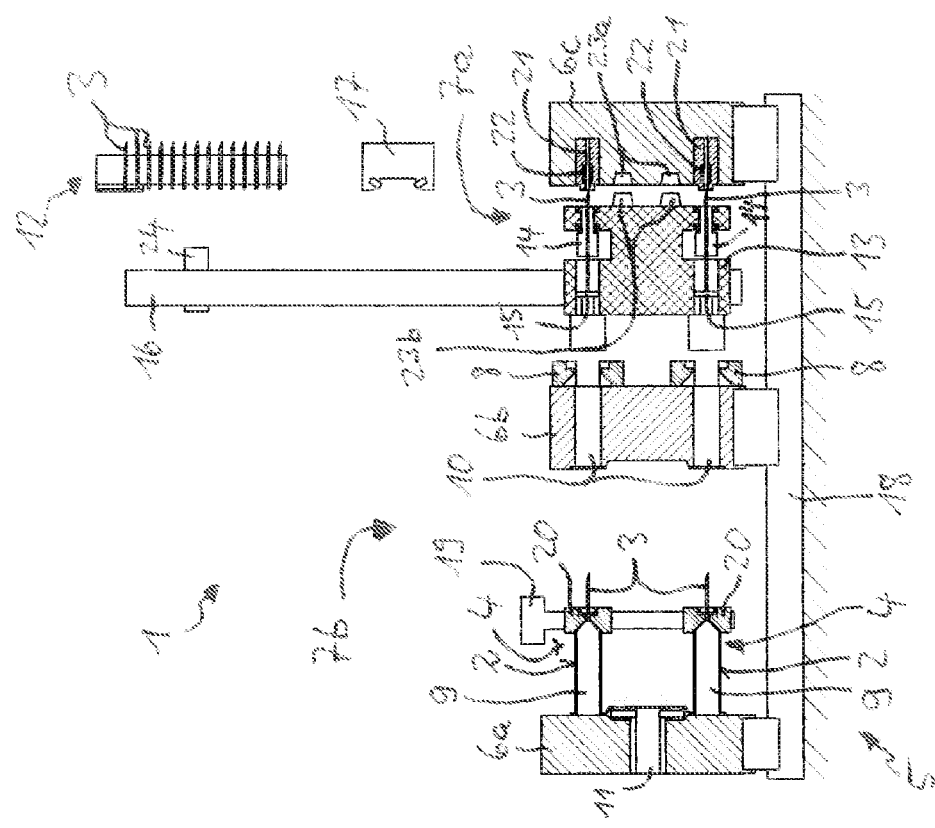

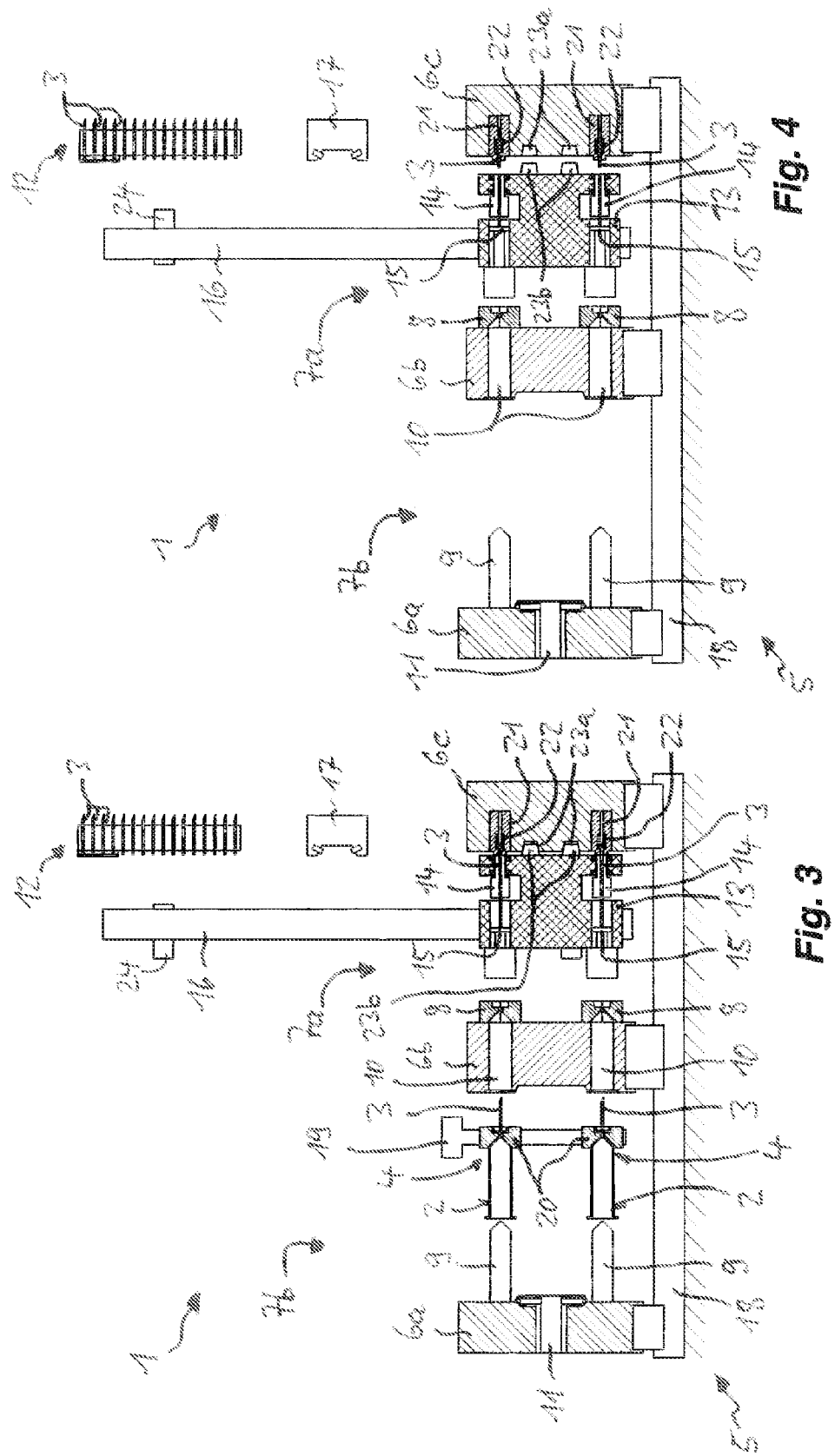

APPARATUS FOR INJECTION MOLDING A PLASTIC MOLDED PART ONTO A FUNCTIONAL PART SO AS TO FORM A MULTI-COMPONENT PART

INCORPORATION BY REFERENCE

Background

The invention relates to an apparatus for injection molding a plastic molded part onto a functional part so as to form a multi-component part, having an injection mold which has a mold opening for receiving the functional part in regions.

Multi-component parts of this type, in which a functional part has plastic injection molded thereon in regions, are known in numerous applications; for example, a syringe cylinder as a plastic molded part may be injection molded onto a hollow needle as a functional part. Aside from the field of medical engineering, numerous applications for example in the electronics field are also conceivable.

Such multi-component parts have hitherto been produced by virtue of the functional part being placed into a mold half of an open injection mold, the injection mold being closed and the plastic molded part being injection molded. After cooling, the injection mold is opened and the finished plastic molded part with the functional part held thereon is removed from the injection mold. A further functional part can thereafter be placed into the injection mold. This however results in increased cycle times for an injection molding process.

SUMMARY

It is therefore the object to provide an apparatus of the type specified in the introduction by which multi-component parts with plastic material injection molded onto a functional part can be produced with a reduced cycle time. Furthermore, it should be possible for the apparatus to be realized in a structurally simple and thus inexpensive form.

This object is achieved according to the invention in that the injection mold has at least three mold plates which can be adjusted between a closed injection position and a processing position with the mold plates spaced apart from one another in each case, in that a functional part carrier, which can be positioned between a functional part store and a first opening region between two mold plates in the processing position thereof, is provided for transferring the functional parts from the functional part store to one of the mold plates, and in that a withdrawal gripper is provided for withdrawing the multi-component part from a second opening region between two mold plates.

As a result of the two opening regions, a finished multi-component part can be removed in one opening region, and a new functional part can simultaneously be inserted into a mold opening of one of the mold plates in another opening region. In this way, the cycle time for producing a multi-component part can be reduced considerably. Within the injection mold there are few moving parts such as would be required for example in the case of a mold with a positionable indexing plate, and therefore the injection mold can be realized in a structurally simple form.

Furthermore, the injection mold can be of compact form with mold plates guided on rails, which permits a precise linear movement of the mold plates, and angle variations such as arise in injection molding machines without rails and which can be a problem for certain mold parts are reliably prevented.

It is expedient for the injection mold to be formed as a multiple mold and for the functional part carrier to be designed for simultaneously transferring a plurality of functional parts and the withdrawal gripper to be designed for simultaneously withdrawing a plurality of multi-component parts. In this way, a plurality of multi-component parts can be produced simultaneously, and the production rate can be increased. With suitable design of the mold plates, it would also be possible to produce multi-component parts which have multiple functional parts.

It is advantageous for the functional part carrier to be mounted so as to be linearly displaceable transversely with respect to the opening axis of the injection mold. Then, when the injection mold is open, the functional part carrier can be introduced into the respective opening region, in order to transfer the one or more functional parts to the mold plate, using a simple linear movement. For this purpose, the functional part carrier may be mounted in a movable manner for example on a guide rail arranged adjacent to the injection mold, along which guide rail said functional part carrier can be positioned between the injection mold and the functional part store.

The withdrawal gripper may have at least one gripper jaw matched in terms of shape to the multi-component part to be produced in each case. In this way, the multi-component part can be reliably gripped and withdrawn without being damaged or being able to fall out of the withdrawal gripper. Here, a plurality of gripper jaws matched in terms of shape may be provided for gripping a multi-component part, and/or a plurality of gripper jaws are provided for simultaneously withdrawing a plurality of multi-component parts.

The gripper jaws may in particular be produced in a laser sintering process, and formed in one piece.

The functional parts are preferably comprised of metal or metal alloys.

In particular, the functional parts may be needles or hollow needles for syringes.

To permit a precise transfer of the functional parts and to be able to separate out faulty or damaged functional parts before the transfer to a mold plate, it is advantageous if at least one apparatus for alignment and/or functional checking of the functional parts held on the functional part carrier is provided. In this way, production of rejects as a result of incorrectly aligned or defective functional parts can be prevented. If an incorrectly aligned functional part is detected, this can be newly aligned or removed from the functional part carrier and exchanged for a further functional part. If a defective or damaged functional part is detected, this can be removed from the functional part carrier, disposed of and replaced with a further functional part, which then in turn undergoes an inspection with regard to position and/or function.

For an accelerated and precise transfer of the functional parts from the functional part store to the functional part carrier, it is advantageous for the functional part store to be assigned a device for separating and aligning the functional parts.

The functional part carrier and/or the mold plate for receiving the functional parts may have fixing elements for the functional parts in order to ensure secure hold of the functional parts and to reliably prevent a functional part from inadvertently slipping out of an intended position within the functional part carrier or the mold plate.

The transfer of a functional part from the functional part carrier to a mold plate or the mold opening thereof can be realized in a particularly simple manner if the functional part carrier has at least one linearly displaceable load-exerting element for transferring a functional part to the respective mold plate. The functional part can then practically be moved from the functional part carrier into the mold plate by being acted on by the load-exerting element.

The functional part carrier and the mold plate for receiving the functional part may each have coupling elements for positioning the two parts on one another. Precise, correct positioning of the two parts with respect to one another, and thus a correspondingly precise alignment also of the functional part during the transfer of a functional part, are thus ensured. To bring the coupling elements into engagement with one another and release said coupling elements from one another again, the functional part carrier can be positioned in a linearly displaceable manner in the opening direction of the injection mold.

Depending on the type of the plastic molded part to be injection molded, it may be expedient for the injection mold to have openable mold inserts. This makes it possible, for example, to injection mold plastic molded parts with bevels or undercuts.

It is expedient for the mold plate provided for receiving the functional part to have at least one receptacle for an exchangeable insert which receives a functional part. By exchanging the exchangeable inserts, a mold plate can be quickly and easily converted for other functional parts without having to exchange the entire mold plate. This permits universal use and inexpensive conversion of the mold plate for different functional parts, for example functional parts which differ in terms of size and/or contour.

Here, the exchangeable inserts may also be mounted so as to be rotatable. This permits a rotation of the functional parts during the injection molding process, which is necessary for example in order to produce Luer lock syringe adapters.

A rotary drive for the exchangeable inserts is expediently provided.

The plastic material for the plastic molded part may preferably be a copolymer. Such materials are particularly well suited to single-use sterile products such as for example filled, packaged insulin syringes or butterfly needles for establishing a permanent access.

A hot runner nozzle in particular may be provided for injecting the plastic material into the injection mold.

Upon the start-up of the injection molding apparatus or after long intervals between injection molding processes, the injection mold is generally too cold to ensure the desired high quality of the injection molded products. The injection mold could be preheated, but this requires additional heating units and is thus cumbersome and expensive. Furthermore, the temperature profile present within the injection mold during the regular injection molding cycle is difficult to reproduce.

Therefore, it is conventional for a small number of injection molding processes to be performed until the injection molding apparatus has been brought up to operating temperature. The injection molded products produced during this time must be separated out. Since the functional parts conventionally have barbs, projections or other regions which ensure a secure and firm connection to the plastic molded part, separating the functional part and the injection molded material of the separated-out initial injection molded products, in order to permit correctly sorted disposal or recycling of the different materials, is possible only with great outlay. Furthermore, the functional parts usually cannot be re-used, which entails high additional costs.

It may therefore be expedient for placeholder parts to be provided which can be inserted into the mold plate provided for receiving the functional part.

During the start-up phase of the injection molding apparatus and the first injection molding cycles for warming up the injection mold, said placeholder parts are inserted into the mold plate instead of the real functional parts. The placeholder parts may be of simpler form than the real functional parts, such that the costs for the rejects produced during the start-up phase are reduced. The placeholder parts may also be provided with a smooth surface without projections or barbs in order to permit simple separation of the placeholder part and injection molded material.

Here, it is advantageous if the mold plate provided for receiving the functional part, the interchangeable inserts or the fixing elements are designed for clamped connection to the placeholder parts during the opening of the injection mold. The placeholder parts thus remain in the region of the mold plate during the opening of the injection mold, and the plastic molded part is separated from the placeholder part directly upon the opening of the injection mold. The plastic molded part can then be directly disposed of or supplied for material recycling. The placeholder part may likewise be disposed of or may possibly remain in the mold plate for a further injection molding cycle of the warm-up phase.

BRIEF DESCRIPTION OF THE DRAWINGS

The apparatus according to the invention will be explained in more detail below on the basis of the drawings, in which:

FIG. 1 shows an apparatus for injection molding a plastic molded part onto a functional part, with the injection mold closed,

FIG. 2 and

FIG. 3 show the apparatus from FIG. 1 with the injection mold open during the withdrawal of the finished multi-component parts and the insertion of the functional parts into one of the mold plates, and FIG. 4 shows the injection mold after the withdrawal of the finished multi-component parts and the insertion of the functional parts into one of the mold plates.

DETAILED DESCRIPTION OF THE PREFERRED EMBODIMENTS

An apparatus, denoted as a whole by 1, for injecting molding a plastic molded part 2 onto a functional part 3 so as to form a multi-component part 4 has, as shown in the Figures, an injection mold 5 with three mold plates 6a, 6b, 6c. The mold plates 6a, 6b, 6c can be adjusted between a closed injection molding position (FIG. 1) and a processing position (FIGS. 2-4) with the mold parts 6a, 6b, 6c spaced apart from one another in each case. Two opening regions 7a, 7b are formed, firstly between the mold plates 6a and 6b, which are spaced apart from one another in the processing position, and secondly between the mold plates 6b and 6c.

In FIG. 1, the injection mold 5 is closed and the nozzle-side mold plate 6a, the middle mold plate 6b and the mold plate 6c for receiving the functional parts 3 are situated in their injection molding position. The middle mold plate 6b is assigned additional openable mold inserts 8. In the closed position, in each case one functional part 3 projects into a mold opening of the injection mold 5 in the region of the openable mold inserts 8. On the nozzle-side mold plate 6a there are arranged injection molding mandrels 9 which extend in each case through a recess 10 (FIGS. 2-4) of the middle mold plate 6b and thus form together with the latter a hollow cylindrical mold opening. Plastic material is injected into the injection mold 5 through a hot runner nozzle 11 on the nozzle-side mold plate 6a, which plastic material passes into the mold openings and surrounds the functional parts 3 in regions in the region of the openable mold inserts 8. In this way, a plastic molded part 2, in this case a syringe body, is injection molded onto the functional part 3 and, in the process, connected to said functional part such that said plastic molded part and functional part together form a multi-component part 4 (FIGS. 2, 3).

During the injection molding process in FIG. 1, further functional parts 3 are transferred from a functional part store 12 to a functional part carrier 13. The functional parts 3, in this case hollow needles for syringes, are transferred from the functional part store 12 into retainers 14 of the functional part carrier 13. The retainers 14 permit a radial alignment of the functional parts 3 in the functional part carrier 13. An axial alignment of the functional parts 3 is realized by abutment against a load-exerting element 15 of the functional part carrier 13. The functional part carrier 13 is mounted so as to be linearly displaceable along a guide rail 16 perpendicular to the opening direction of the injection mold 5. By means of a corresponding linear displacement of the functional part carrier 13, the functional parts 3 are supplied to a device 17 for position and functional inspection. If a functional part 3 is damaged or inserted incorrectly into the functional part carrier 13, said functional part can be ejected from the functional part carrier 13 and replaced with another functional part 3, such that damaged functional parts 3 are prevented from being inserted into the injection mold 5.

After the injection molding process and after the plastic material has cooled, the injection mold 5 is opened and the mold plates 6a, 6b, 6c are moved into their processing position. The middle mold plate 6b and the mold plate 6c for receiving the molded parts 3 are, for this purpose, mounted in a linearly displaceable manner on a guide rail 18. To open the injection mold 5, the openable mold inserts 8 are moved into their open position and are moved together with the middle mold plate 6b away from the nozzle-side mold plate 6a, and the mold plate 6c is likewise displaced linearly, such that a first opening region 7a is formed between the middle mold plate 6b and the mold plate 6c for receiving the functional parts 3, and a second opening region 7b is formed between the nozzle-side mold plate 6a and the middle mold plate 6b.

The plastic molded parts 2 with the functional parts 3 onto which they are injection molded remain held on the injection molding mandrels 9 of the nozzle-side mold plate 6a during the opening of the injection mold 5. Through the use of a withdrawal gripper 19, the finished multi-component parts 4 are subsequently gripped (FIG. 2), pulled from the injection molding mandrels 9 (FIG. 3) and removed from the second opening region 7b of the injection mold 5. Here, the extraction gripper 19 has gripper jaws 20 matched to the respective multi-component part 4.

During the withdrawal of the multi-component parts 4 from the injection mold 5, the functional part carrier 13 is moved along its guide rail 16 into the first opening region 7a of the injection mold 5 (FIG. 2). The guide rail 16 is mounted so as to be linearly displaceable in the opening direction of the injection mold 5 via two guides 24, such that the functional part carrier 13 can be made to approach the mold plate 6c for receiving the functional parts 3 (FIG. 3).

In said approximated position, the functional parts 3 are transferred into in each case one interchangeable insert 21 of the mold plate 6c by axial displacement of the load-exerting elements 15 of the functional part carrier 13. Additional fixing elements 22 are provided in order to hold the functional parts 3 securely in their position.

In order that the functional part carrier 13 and the mold plate 6c are aligned in a precise position with respect to one another during the transfer of the functional parts 3, and thus a precise transfer of the functional parts 3 is ensured, coupling elements 23a, 23b are provided in each case on the functional part carrier 13 and on the mold plate 6c, which coupling elements, in the transfer position, engage into one another and fix the functional part carrier 13 to the mold plate 6c in the desired position.

In FIG. 4, the functional part carrier 13 has been pulled back from the mold plate 6c again after the transfer of the functional parts 3, such that the functional part carrier 13 moves along its guide rail 16 and out of the first opening region 7a of the injection mold 5, the injection mold 5 is closed, and a further injection process can be performed as per FIG. 1.

Since new functional parts 3 are mounted on the functional part carrier 13 during an injection molding process and the functional part carrier 13 is moved into the opening region 7a in order to supply new functional parts 3 to the injection mold 5 during the withdrawal of the finished multi-component parts 4, composed of functional part 3 and plastic molded part 2 injection molded thereon, in the second opening region 7b, a reduced cycle time and thus a high production rate are possible. Since the functional parts 3 are precisely aligned, and checked for correct function and for damage, before being inserted into the mold plate 6c, production of rejects can be at least substantially prevented.

In the functional part store 12 illustrated in the Figures, the functional parts 3, in this case hollow needles for syringes, have already been separated and sorted into the correct position. The supply of the functional parts 3 from an unordered store (not illustrated) to said ordered functional part store 12 may for example be realized by virtue of the functional parts 3 being individually separated off from a material box containing unsorted functional parts 3 by a slide or an arc. Here, both a slide and also an arc may have a plurality of notches which can receive in each case only a single functional part. In particular if the functional parts are needles, these can be supplied to the functional part store 12 by hollow lines and compressed air or a vacuum. Here, the hollow lines may be comprised of metal, in particular high-grade steel, or of flexible material. To prevent damage both to the needles and to the hollow lines, the needles are in this case transported with the tip pointing rearward. The unordered store may be a material box which is automatically changed when it is empty.

Since, upon start-up of the apparatus 1 or after relatively long intervals between injection molding processes, the injection mold 5 is too cold to ensure the normally demanded high quality of the injection molded products, it is necessary for a small number of injection molding processes to firstly be performed, following which the injection molded plastic molded parts 2 are subsequently disposed of. To prevent the normally high-grade and thus expensive functional parts 3 onto which the plastic material is injection molded from likewise having to be disposed of as a result, placeholder parts (not illustrated) may be provided which, upon start-up of the device 1 or after relatively long intervals between injection molding processes, are received by the functional part carrier 13, and transferred into the mold plate 6c, instead of the functional parts 3. The first injection molding cycles are then performed not with the real functional parts 3 but rather with said placeholder parts, which can be produced at lower cost than the real functional parts 3. Furthermore, the placeholder parts may be formed such that they can be easily separated from the plastic molded part 2 after the injection molding process, such that correctly sorted recycling of the plastic material, and if appropriate also of the placeholder parts, is possible.

The placeholder parts may also be formed such that they remain in the mold plate 6c during the opening of the injection mold 5, and thus the plastic molded part 2 is automatically separated from the placeholder part during the opening of the injection mold 5, such that separate processes for separating the two parts are not necessary.

If different multi-component parts 4 are to be produced, for example syringes with cannulas of different thickness as a functional part 3, it is also possible for correspondingly differently dimensioned placeholder parts to be provided which are transferred, as required, to the mold plate 6c by means of the functional part carrier 13.

To adapt the device 1 to different functional parts 3 in order to be able to produce different multi-component parts 4, interchangeable inserts 21 are provided on the mold plate 6c, which interchangeable inserts can be easily removed and exchanged for interchangeable inserts 21 adapted to the respective functional part 3. It is thus possible in an inexpensive manner and with little outlay in terms of construction to produce multi-component parts 4 with different functional parts 3, for example syringes with different cannulas. By exchanging the mold plates 6a, 6b and the mold inserts 8, it is also possible for different plastic molded parts 2 to be injection molded, such that a device 1 can, with relatively little outlay, be converted to produce a wide variety of multi-component parts. It is possible to use a standard injection molding machine which, through suitable selection of the mold plates and mold inserts and of the interchangeable inserts, can be adapted in a flexible manner to different multi-component parts to be produced. Cumbersome interchangeable mold plates with part cavities for receiving the functional parts are not necessary, and simpler automated operation of the device is possible. As a result of the inspection of the functional parts before the insertion thereof into the mold plate provided therefor and before the injection molding of the plastic material, production of rejects can be prevented.

The invention claimed is:

1. An apparatus (1) for injection molding a plastic molded part (2) onto a functional part (3) so as to form a multi-component part (4), the apparatus comprising: an injection mold (5) which has a mold opening for receiving the functional part (3) in regions, the injection mold (5) has at least three mold plates (6a, 6b, 6c) which can be adjusted between a closed injection position and a processing position with the mold plates (6a, 6b, 6c) spaced apart from one another in each case, a functional part carrier (13), which is positionable between a functional part store (12) and a first opening region (7a) between two of the mold plates (6b, 6c) in the processing position thereof, that transfers the functional parts (3) from the functional part store (12) to one of the mold plates (6c), and a withdrawal gripper (19) that withdrawals the multi-component part (4) from a second opening region (7b) between two of the mold plates (6a, 6b).

2. The apparatus as claimed in claim 1, wherein the injection mold (5) is formed as a multiple mold and the functional part carrier (13) is adapted to simultaneously transfer a plurality of the functional parts (3) and the withdrawal gripper (19) is adapted to simultaneously withdraw a plurality of the multi-component parts (4).

3. The apparatus as claimed in claim 1, wherein the functional part carrier (13) is mounted to be linearly displaceable transversely with respect to an opening axis of the injection mold (5).

4. The apparatus as claimed in claim 1, wherein the withdrawal gripper (19) has at least one gripper jaw (20) that has a shape matched to the multi-component part (4) to be produced in each case.

5. The apparatus as claimed in claim 1, wherein the functional parts (3) are comprised of metal or metal alloys.

6. The apparatus as claimed in claim 1, wherein the functional parts (3) are needles or hollow needles for syringes.

7. The apparatus as claimed in claim 1, wherein at least one apparatus (17) for at least one of alignment or functional inspection of the functional parts (3) is held on the functional part carrier (13).

8. The apparatus as claimed in claim 1, wherein the functional part store (12) has a device for separating and aligning the functional parts (3).

9. The apparatus as claimed in claim 8, wherein at least one of the functional part carrier (13) or the mold plate (6c) for receiving the functional parts (3) have fixing elements (22) for the functional parts (3).

10. The apparatus as claimed in claim 1, wherein the functional part carrier (13) has at least one linearly displaceable load-exerting element (15) for transferring one of the functional parts (3) to the respective mold plate (6c).

11. The apparatus as claimed in claim 10, wherein the functional part carrier (13) and the mold plate (6c) for receiving the functional parts (3) each have coupling elements (23a, 23b) for positioning the two parts on one another.

12. The apparatus as claimed in claim 1, wherein the injection mold (5) has openable mold inserts (8).

13. The apparatus as claimed in claim 1, wherein the mold plate (6c) provided for receiving the functional part (3) has at least one receptacle for an interchangeable insert (21) which receives the functional part (3).

14. The apparatus as claimed in claim 13, wherein the interchangeable inserts (21) are mounted so as to be rotatable.

15. The apparatus as claimed in claim 14, wherein a rotary drive for the interchangeable inserts (21) is provided.

16. The apparatus as claimed in claim 1, wherein the molded part (2) is molded from a plastic material that is a copolymer.

17. The apparatus as claimed in claim 16, wherein a hot runner nozzle (11) is provided for injecting the plastic material into the injection mold (5).

18. The apparatus as claimed in claim 1, wherein placeholder parts are provided which can be inserted into the mold plate (6c) provided for receiving the functional part (3).

19. The apparatus as claimed in claim 18, wherein the mold plate (6c) is provided for receiving the functional part (3) or for receiving an interchangeable insert (21) which receives the functional part, or fixing elements (22) are provided for clamped connection to the placeholder parts during opening of the injection mold (5).

* * * * *